April 12, 1966  J. M. SMITH  3,245,702
LEAKPROOF JOINT
Filed Aug. 5, 1965
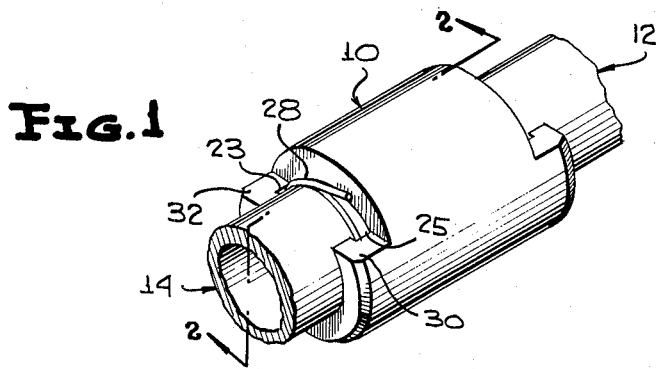
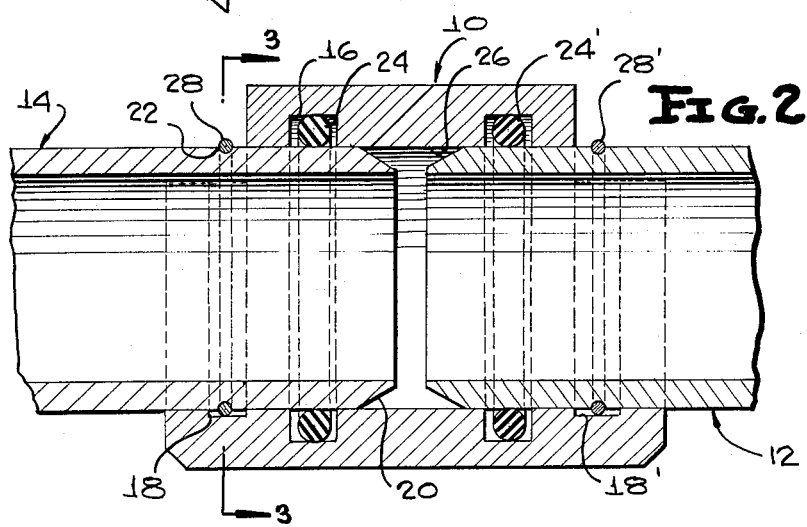
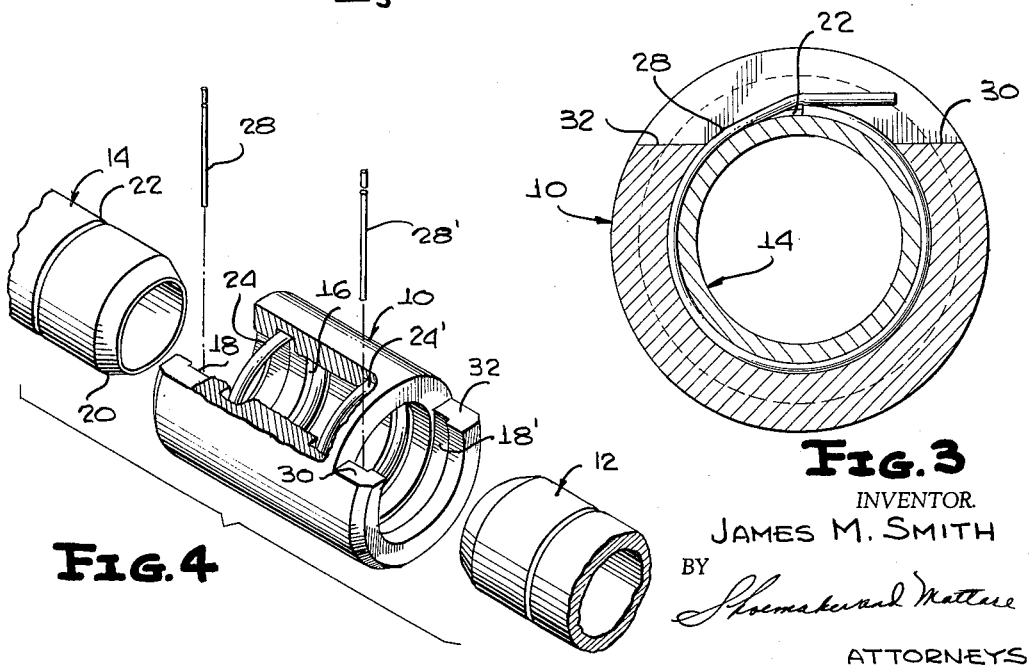
INVENTOR.
JAMES M. SMITH
BY
Shoemaker and Mattare
ATTORNEYS

United States Patent Office 3,245,702
Patented Apr. 12, 1966

3,245,702
LEAKPROOF JOINT
James M. Smith, 2707 Millwood Drive,
Newport News, Va.
Filed Aug. 5, 1965, Ser. No. 480,545
1 Claim. (Cl. 285—305)

The present application is a continuation of copending U.S. patent application Serial No. 233,262, filed October 26, 1962, now abandoned.

This invention relates to Joints, and particularly to improved Leakproof Pipe or Rod Joints.

Briefly, the invention comprises two tubular members having axially aligned adjacent ends enclosed by a sleeve. Each end of the sleeve has a pair of axially spaced arcuate recesses formed in its inner surface. The axially inner recess contains a flexible seal which engages the periphery of one of the tubular members and the outer recess is radially aligned with a peripheral recess of semi-circular cross section in the end of one of the tubular members. A wire member is contained in the arcuate chamber defined by the semi-circular recess in the tubular member and the outer recess in the sleeve so as to positively limit axial movement between the sleeve and the tubular member. Preferably, one of the arcuate recesses defining the arcuate chamber which contains the wire is axially elongated so as to permit a limited amount of axial movement between the sleeve and the tubular member. This in turn permits axial movement between the adjacent ends of the tubular members. Preferably the ends of the sleeve have a chord-like portion removed therefrom so as to expose the ends of the wire in the arcuate chamber. Accordingly, it is a primary object of the invention to provide an improved joint releasably connecting the ends of a pair of axially aligned members.

It is another object of the invention to provide a joint or coupling for rigidly connecting the ends of a pair of axially aligned members in such a manner that a limited amount of axial movement between the members is permitted.

It is yet another object of the invention to provide an improved leakproof joint, wherein the parts thereof are keyed together by plain round wire which may be cut from a spool.

It is yet another object of the invention to provide a novel leakproof pipe joint connected together by wire wherein certain portions of the joint are removed so that the wire may be easily installed or removed from the joint for assembling and disassembling same.

It is yet another object of the invention to provide a novel pipe joint which may be used for connecting any conventional pipes, rods, or tubes, regardless of size, is of simple and economical design, is substantially foolproof in operation, requires no skill on the part of the operator installing or removing the joint and is extremely durable and reliable in use. The joint is a substantial improvement over ones previously in use because it eliminates the complicated and expensive processes of soldering, welding, threading and flaring.

It is yet another object of the invention to provide a joint for connecting two members which permits the members to be connected while wet, eliminates the necessity for heat while connecting the members thereby permitting a joint to be made between tubes or conduits containing gas or other combustible materials without the hazard of fire or explosion, and to provide a joint so designed that a novice can install it quickly and efficiently and a professional can use it more expeditiously.

It is still another object of the invention to provide a coupling or joint that is adapted for connecting members composed of copper, aluminum, stainless steel, plastic, hard rubber, iron, and other conventional materials.

It is still another object of the invention to provide a pipe joint suitable for connecting rigid conduits containing electrical wiring and so designed that it permits the wiring to be easily threaded through the conduits.

It is yet another object of the invention to provide a pipe joint for connecting two separate pipe or conduit sections without constricting the interior of the sections, eliminates the need for special clamping rings, and is unusually strong, thereby eliminating the danger of structural failure.

The invention will be best understood from a consideration of the following detailed description taken in connection with the accompanying drawings, wherein:

FIG. 1 is a perspective view of the invention;

FIG. 2 is an enlarged cross sectional view taken substantially on the plane of line 2—2 of FIG. 1;

FIG. 3 is a cross sectional view taken substantially on the plane of line 3—3 of FIG. 2; and FIG. 4 is an exploded perspective view of the invention.

As illustrated in the drawings, a pair of pipes and a sleeve comprise a pipe coupling which includes two identical joints.

As illustrated in the drawings wherein like reference numerals indicate the same parts throughout the various figures, the invention includes a sleeve 10 telescopically receiving adjacent ends of axially aligned tubes 12 and 14.

As illustrated in the drawings, the left half of the sleeve 10 is formed with an internal circular sealing groove 16 at the central portion of the left half of the sleeve. Adjacent the left end of the sleeve, its internal surface is provided with an arcuate groove 18 also rectangular in cross section but of substantially less radial extent than the groove 16.

The tube or pipe 14 is of conventional construction and annular in cross section. The free end of the tube is chamfered so as to provide a smooth tapered end surface 20. The external periphery of the tube 14 is formed with a circular channel or groove 22 which is semi-circular in cross section and spaced axially inwardly from the chamfered end surface 20. The external diameter of the tube 14 is preferably slightly smaller than the internal diameter of the sleeve 10 whereby the tubes may slide snugly within the sleeve as shown in FIG. 2.

A chord-shaped section is removed from the left end of the sleeve 10 which contains a portion of the arcuate groove 18. When this chord-shaped section is removed, the groove 18 is formed with opposite ends 23 and 25. It will be noted that this removed section or recess is defined by a radial planar face and a chordal planar face extending parallel to the axis of sleeve 10, this chord-shaped recess extending axially from the edge of groove 18 remote from the associated end of the sleeve all the way to the end of the sleeve. This particular construction facilitates machining and manufacture of the apparatus and provides ready access for the insertion of a wire hereinafter described, while at the same time not substantially reducing the strength of the assembly.

Before the free end of the tube 14 is inserted within the sleeve 10, a conventional annular O-ring 24 composed of flexible material such as rubber, is inserted into the sealing groove 16. As illustrated, the O-ring is circular in cross section and the cross sectional diameter thereof is slightly greater than the radial depth of the groove 16. This causes the radially inner surface of the O-ring 24 to project radially inwardly slightly beyond the inner surface 26 of the sleeve 10.

To connect the tube 14 to the sleeve 10, it is only necessary to axially insert the tapered end of the tube into the passageway defined by surface 26 in sleeve 10. When the tapered or chamfered surface 20 contacts the O-ring 24, it compresses the O-ring and cams it radially outwardly until it rides over the outer peripheral surface of the tube 14. The chamfered surface 20 is extremely smooth thereby ensuring that the O-ring will not be damaged when it contacts the surface. The tube 14 is pushed inwardly into the sleeve until the channel 22 is radially aligned with the arcuate groove 18. A straight section of pre-cut wire is then inserted into one of the ends 23 or 25 of the channel 22 and the wire is pushed into the space defined between the channel 22 and groove 18. As the wire is pushed into the space it is forced into a circular configuration by the surfaces of the channel 22 and groove 18 and one end of the wire eventually emerges from the other end 23 or 25. After the wire has been completely inserted into the channel 22 and recess 18, the ends thereof may be bent into overlapping relation as shown in FIG. 1, or alternatively they may be twisted together or bent radially outwardly over the ledges 30 and 32 formed by the removal of the chord-shaped section from the sleeve 10.

As shown in FIG. 2, the cross sectional radius of the wire 28 is substantially the same as the cross sectional radius of the channel 22 and the radius of the wire is substantially equal to the radial depth of the groove 18. However, since the axial dimension of the groove 18 is substantially greater than the diameter of the wire 28, the tube 14 and sleeve 10 may be moved relative to one another in an axial direction to a degree limited by the axial dimension of the groove 18. However, once the wire 28 contacts the side walls of the groove 18, further axial movement between the sleeve and tube are positively prevented. Thus, the wire 28 positively locks the tube 14 and sleeve 10 together. Also it does permit limited relative axial movement therebetween. Since the O-ring seal 24 is compressed between the outer surface of tube 14 and the bottom wall of the groove 16, a tight seal is always maintained between the surface 26 of the sleeve and the outer surface of the tube.

The tube 12 is of identical size, shape and construction as the tube 14 and the right half of the sleeve 10 is of identical size, shape and construction as the left half thereof. Thus, the tube 12 and right half of the sleeve 10 are sealed and connected together by the O-ring 24' and wire 28' in exactly the same manner as the tube 14 and the left half of the sleeve. However, as clearly shown in FIG. 2, the ends of the tubes 12 and 14 do not extend to the center of the sleeve whereby a space is provided between the ends of the tubes so they may have limited axial movement relative to one another as limited by the axial dimensions of the grooves 18 and 18'.

For simplicity, the sleeve 19 is shown as being of straight tubular shape. However, it is to be understood that the principles of this invention could easily be employed in pipe fittings which are of T-shape, L-shape, Y-shape, or other desired shapes.

The above described joint is particularly useful in connecting members composed of aluminum because aluminum is inherently extremely difficult to weld or solder.

Where electrolysis is a factor such as in underground pipe lines, the sleeve 10 must be metallic or else a jumper of metal must be used to connect the ends of the tubes. Conversely, if the pipes are metallic, then the sleeve 10 must be of a non-conductive material as plastic or rubber, if it is desired to insulate the pipes from one another.

The pipe joint of this invention may be used to connect members of any size or cross sectional shape.

As this invention may be embodied in several forms without departing from the spirit or essential characteristics thereof, the present embodiment is therefore illustrative and not restrictive, since the scope of the invention is defined by the appended claim rather than by the description preceding the claim, and all changes that fall within the metes and mounds of the claim or that form their functional as well as conjointly cooperative equivalents, are therefore intended to be embraced by the claim.

I claim:

A coupling comprising two tubes having adjacent slightly spaced ends, a cylindrical sleeve having a bore therethrough telescopically receiving said ends with minimum clearance, the interior surface of said sleeve having an arcuate groove therein of generally rectangular cross sectional configuration adjacent each end of the sleeve, the exterior surface of each tube being provided with a peripheral channel formed therearound of semi-circular cross section in radial alignment with one of said grooves so as to form therewith an arcuate chamber, each end of said sleeve being provided with a chord-shaped recess extending peripherally of the sleeve approximately 45° and extending axially from the edge of each groove remote from the associated end of the sleeve to the associated end of the sleeve and exposing and defining two open ends of the associated groove and flat ledges adjacent thereto and exposing a portion of the adjacent channel, each of said recesses being defined by a radial planar face and a chordal planar face extending parallel to the axis of said sleeve, a flexible wire extending through each of the chambers defined by one of said grooves and one of said channels and being of circular cross sectional configuration having a radius substantially equal to the radius of said channel, the radius of said wire also being substantially equal to the depth of said groove thereby preventing relative radial motion between said tubes and sleeve ends, each groove having an axial length substantially greater than the diameter of said wire so that each wire will prevent separation of said sleeve and one of said tubes and yet permit relative axial movement therebetween, each of said wires being of a length greater than the length of the associated chamber defined by a channel and groove with the end portions of each wire extending outwardly of the ends of the associated groove and being in engagement with at least one end portion of each wire being bent over the opposite end portion thereof and thereby encompassed within the confines of said recess, and flexible seal means between said sleeve and each of said tubes whereby the interior of said sleeve is sealed from the exterior thereof.

References Cited by the Examiner

UNITED STATES PATENTS

| | | | |
|---|---|---|---|
| 2,436,407 | 2/1948 | Stephens | 285—383 |
| 2,440,452 | 4/1948 | Smith | 285—321 |
| 2,597,482 | 5/1952 | Harrison | 285—305 |
| 2,749,151 | 6/1956 | Lyons | 285—305 |
| 2,760,258 | 8/1956 | Rieger | 285—321 |

FOREIGN PATENTS 768,974   2/1957   Great Britain.

CARL W. TOMLIN, *Primary Examiner.*

R. GIANGIORGI, *Assistant Examiner.*